(12) United States Patent
Horlacher et al.

(10) Patent No.: US 6,349,708 B1
(45) Date of Patent: Feb. 26, 2002

(54) METHOD AND APPARATUS FOR CONTROLLING AN INTERNAL COMBUSTION ENGINE WITH A MECHANICALLY DRIVEN SUPERCHARGER

(75) Inventors: Rainer Horlacher, Schwäbisch Hall; Roland Kemmler, Stuttgart; Wolfgang Widmann, Erdmannhausen, all of (DE)

(73) Assignee: DaimlerChrylser AG, Stuttgart (DE)

( * ) Notice: Subject to any disclaimer, the term of this patent is extended or adjusted under 35 U.S.C. 154(b) by 0 days.

(21) Appl. No.: 09/534,311

(22) Filed: Mar. 23, 2000

(30) Foreign Application Priority Data

Mar. 23, 1999 (DE) .......................................... 199 12 890

(51) Int. Cl.$^7$ ................................................. F02B 33/00
(52) U.S. Cl. ..................................... 123/559.3; 60/611
(58) Field of Search ........................ 123/599.3; 60/607, 60/608, 611, 602

(56) References Cited

U.S. PATENT DOCUMENTS 4,589,396 A * 5/1986 Tokushima et al. ...... 123/559.3
4,669,441 A * 6/1987 Okimoto ................... 123/559.3
5,150,693 A * 9/1992 Ohnaka et al. ........... 123/559.3
5,307,783 A * 5/1994 Satoya et al. ............. 123/559.3

FOREIGN PATENT DOCUMENTS

| DE | 35 12 408 A1 | 10/1985 |
| DE | 195 33 333 C2 | 3/1997 |
| JP | 63-75317 | 4/1988 |
| JP | 63-272918 | 11/1988 |

* cited by examiner

Primary Examiner—Hoang Nguyen
(74) Attorney, Agent, or Firm—Crowell & Moring LLP

(57) ABSTRACT

A method is provided for controlling an internal combustion engine with a mechanically driven supercharger which can be switched on and off by means of a clutch and is arranged in a charge-air line. A bypass-air line with a bypass-air control element connects the intake and delivery sides of the supercharger. A throttle valve is situated upstream of the supercharger or downstream in the charge-air line. The clutch and/or the bypass-air control element are controlled with specifiable values for a degree of opening and/or a switching state of the clutch, and, in a specified part-load range of the internal combustion engine, the bypass-air control element closes the bypass-air line when the clutch is open.

10 Claims, 2 Drawing Sheets

METHOD AND APPARATUS FOR CONTROLLING AN INTERNAL COMBUSTION ENGINE WITH A MECHANICALLY DRIVEN SUPERCHARGER

BACKGROUND AND SUMMARY OF THE INVENTION

This application claims the priority of German Patent Application 199 12 890.1, filed Mar. 23, 1999, the disclosure of which is expressly incorporated by reference herein.

The invention relates to a method and apparatus for controlling an internal combustion engine with a mechanically driven supercharger which can be switched on and off by means of a clutch and is arranged in a charge-air line, a bypass-air line with a bypass-air control element connecting the intake and delivery sides of the supercharger, a throttle valve being situated upstream of the supercharger or downstream in the charge-air line, and an engine control unit controlling the clutch and/or the bypass-air control element with specifiable values for a degree of opening and/or a switching state of the clutch.

In the case of internal combustion engines, superchargers driven mechanically by the latter are generally used to boost the full-load torque of the internal combustion engine. To improve fuel consumption in the part-load range of the internal combustion engine, the supercharger is switched on and off as required by means of a clutch. It is thus possible to save the driving power for the supercharger when the supercharger is switched off. When the supercharger is switched on by means of the clutch, the driver feels a distinct switch-on jerk, particularly in the upper part-load range, this being caused by a sag in the torque of the internal combustion engine due to the mass moment of inertia of the supercharger during its acceleration. This phenomenon occurs especially when accelerating from part load, and the jerk is all the greater, the greater the load when switching on. The smallest jerk is obtained if the supercharger is switched on directly above the idling range during an acceleration process. Since this operating range of the internal combustion engine up to the switching on of the supercharger is very small, the advantage in terms of consumption dwindles.

German Patent Document DE 195 33 333 C2 discloses a method for controlling a supercharged internal combustion engine in which a supercharger is arranged in a charge-air line and can be switched on and off by means of a clutch. A throttle valve is arranged upstream or downstream of the supercharger. A bypass-air line connects the intake and delivery sides of the supercharger. A bypass-air control element controls and regulates flow through the bypass-air line. It is controlled together with the clutch of the supercharger by an engine control system as a function of operating states and operating parameters of the internal combustion engine. To avoid jerking when switching on and off, the clutch is permanently closed during cruise-control operation above a speed threshold, which is preferably subject to hysteresis. For the transition from overrun cut-off to engine-driven operation, provision is furthermore made for the clutch to be activated in a defined manner only after the resumption of combustion. As an alternative, the clutch can be controlled by means of a regulated-current output stage, or the torque of the internal combustion engine can be raised by influencing the throttle-valve angle in a defined manner, thus compensating for the sag in torque.

German Patent Document DE 35 12 408 A1 has disclosed an internal combustion engine with a supercharger which is driven mechanically by the internal combustion engine via a clutch. When a specified load signal occurs, the flow of fresh gas is initially switched from a bypass line which bypasses the supercharger to the supercharger before the clutch is closed, with the result that rotation is imparted to the supercharger by the fresh air drawn in. This is intended to avoid operating shocks when closing the clutch. Since, before the clutch is closed, the supercharger must first be brought up to a sufficient rotational speed to avoid the operating jerk, the process of switching on the supercharger is delayed.

An object on which the invention is based is, by simple means, to reduce the jerk when the supercharger is switched on in the part-load range. According to the invention, it is achieved by a system of the above noted type, wherein in a specified part-load range of the internal combustion engine, the bypass-air control element closes the bypass-air line as soon as the clutch is open.

According to the invention, the switching off of the supercharger can be extended to the maximum possible range. Favourable part-load consumption figures are thereby obtained. To avoid the severe switch-on jerk in these operating ranges, the bypass-air control element closes the bypass-air line when the clutch is open. The internal combustion engine thus draws the charge air in via the supercharger and the flowing air imparts a rotary motion to the rotors of the supercharger. Measurements have shown that, in the case of a Roots blower as a supercharger, the rotational speed of the supercharger reaches approximately the speed of the internal combustion engine. Since the supercharger rotates continuously in intake mode, the jerk caused by the mass moment of inertia when engaging the clutch of the supercharger is reduced. The rotational speed of the supercharger can be influenced in an advantageous manner when the clutch is open if the bypass-air control element closes the bypass-air line to a greater or lesser extent.

In combination with the measures proposed, it may be expedient according to certain contemplated embodiments of the invention to increase the torque of the internal combustion engine while the clutch is being engaged. This can be accomplished by opening the fuel metering element, e.g. in the form of a throttle valve, of the internal combustion engine. The ignition and/or the camshaft of the internal combustion engine can furthermore be adjusted accordingly and/or use can be made of the switchability of the intake pipe.

Further advantages will become apparent from the following description of the drawing. The drawing shows an illustrative embodiment of the invention. The description and the claims contain numerous features in combination. The person skilled in the art will expediently also consider the features individually and combine them to give further worthwhile combinations.

Other objects, advantages and novel features of the present invention will become apparent from the following detailed description of the invention when considered in conjunction with the accompanying drawings.

BRIEF DESCRIPTION OF THE DRAWINGS

FIG. 5 shows a characteristic curve of the torque variation of the internal combustion engine against time while the supercharger is being switched on.

DETAILED DESCRIPTION OF THE DRAWINGS

Figure 1:
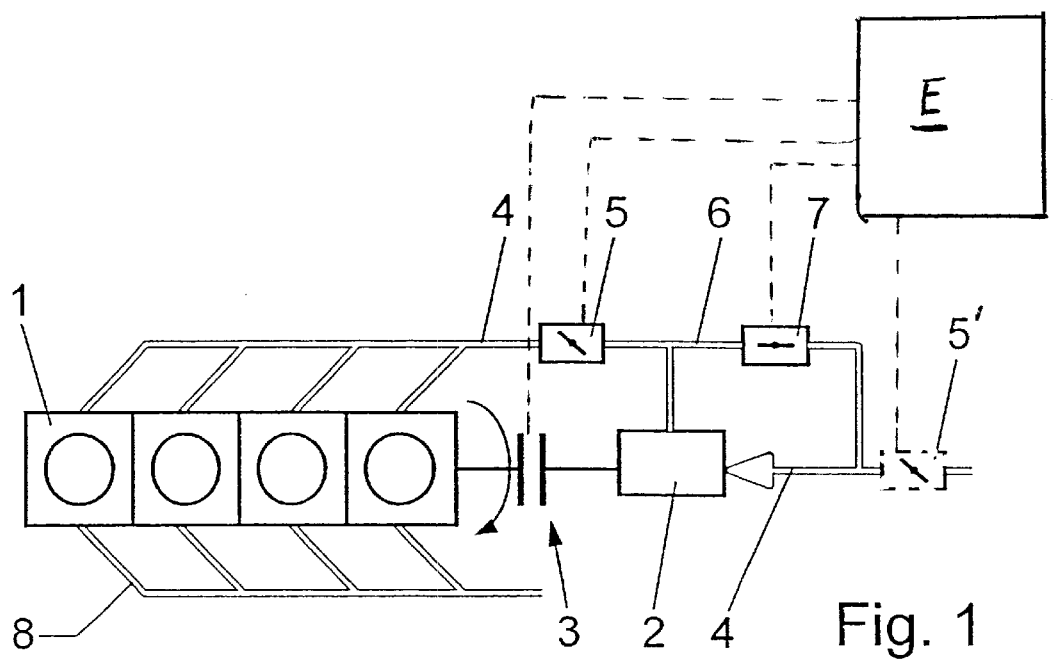
FIG. 1 is a schematic representation of an internal combustion engine for carrying out the method according to the invention, in the idling range with a supercharger which is switched off.

An internal combustion engine 1 drives a supercharger 2 mechanically, either directly or via a belt or chain drive (not shown specifically), and via a clutch 3. The supercharger 2 is situated upstream of a throttle valve (shown as 5' in dash lines) in a charge-air line 4 and draws air in via a damper filter (not shown). One possible variant is for the throttle valve 5 to be fitted upstream of the supercharger. A bypass-air line 6 connects the intake and delivery sides of the supercharger 2, and a bypass-air control element 7 is arranged in it. An exhaust system 8 is provided on the other side of the internal combustion engine 1.

Figure 4:
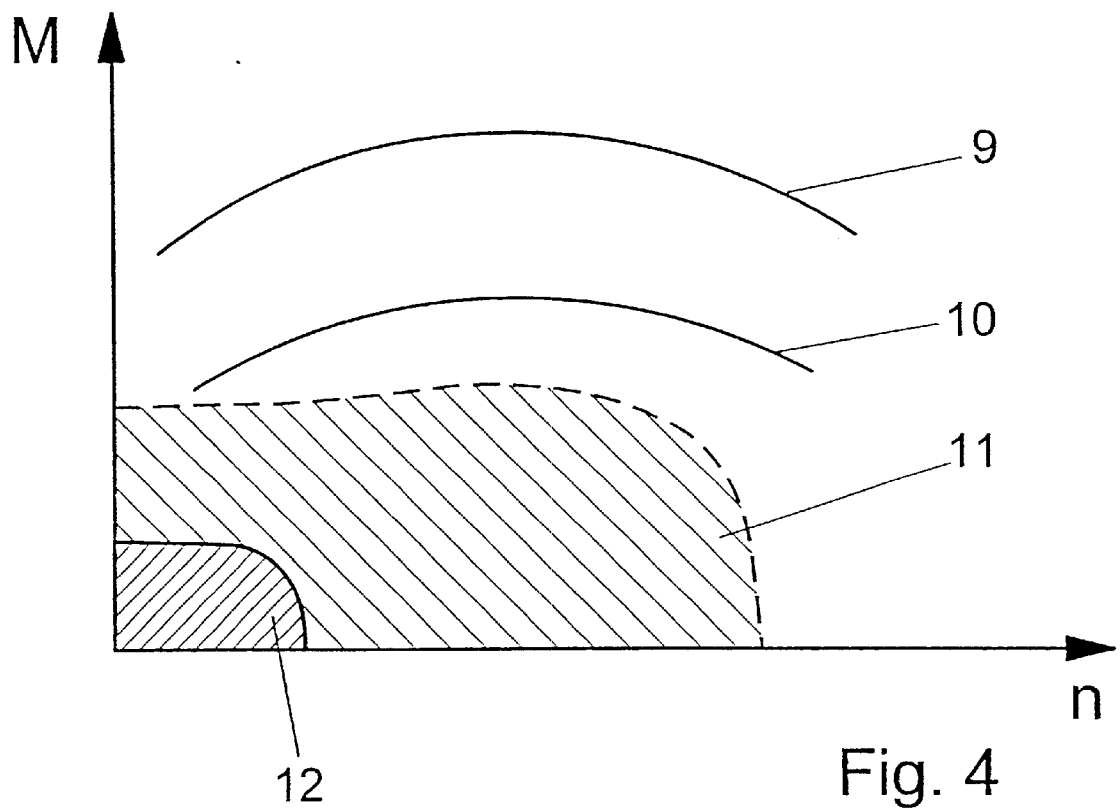
FIG. 4 shows a characteristic diagram of the torque of the internal combustion engine against its speed.

The clutch 3, the bypass-air control element 7 and the throttle valve 5 are controlled by engine electronics schematically depicted at E in FIG. 1; as a function of operating states and/or operating parameters. FIG. 4 illustrates a number of operating states in a characteristic diagram which shows the torque M of the internal combustion engine 1 as a function of its speed n. In a range 12, which characterizes the idling range and a small adjoining part-load range in which the load is very small, the supercharger 2 is switched off since the clutch 3 is open (FIG. 1). The bypass-air control element 7 is likewise open, allowing the internal combustion engine 1 to draw air in via the bypass-air line 6. The supercharger 2 is stationary. A further range 11 characterizes a part-load range with a higher load of the internal combustion engine 1, with the clutch 3 being open and the bypass-air control element 7 being completely or largely closed. As a result, the internal combustion engine 1 draws air in through the supercharger 2 via the charge-air line 4. The airflow causes the mechanically decoupled supercharger 2 to rotate (FIG. 2).

Figure 2:
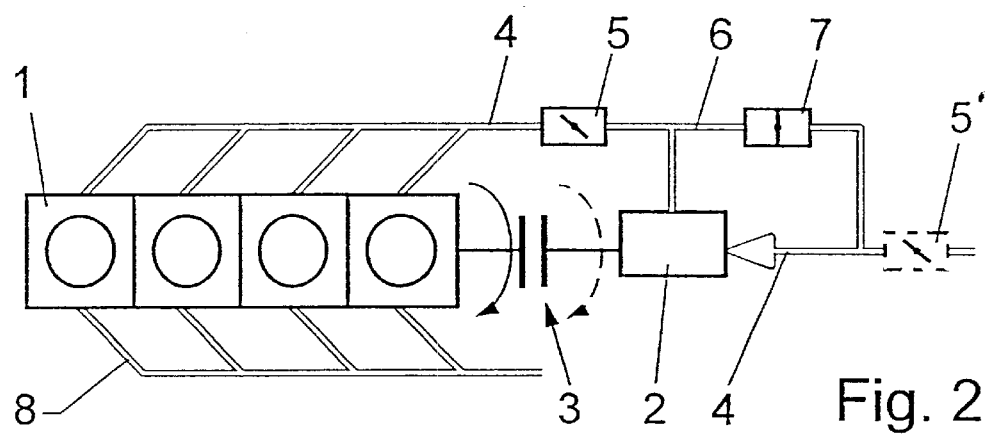
FIG. 2 is a schematic representation of an internal combustion engine corresponding to FIG. 1 in the part-load range.
Figure 3:
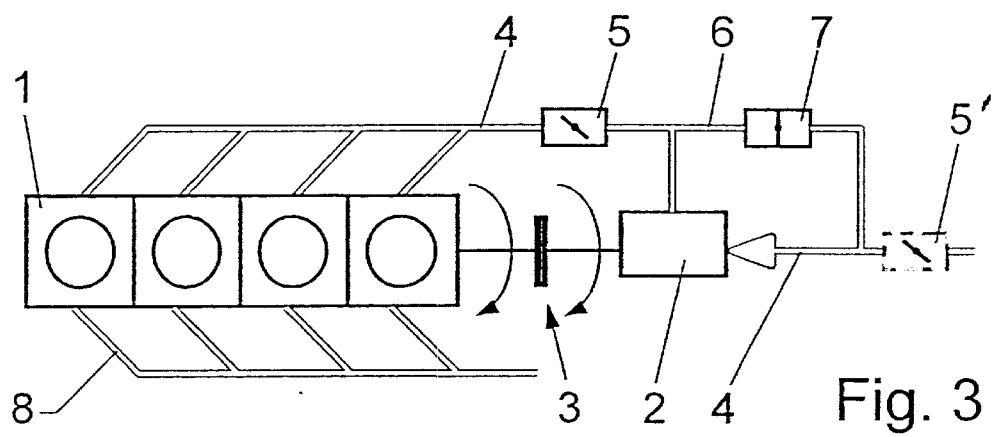
FIG. 3 is a schematic representation of an internal combustion engine in the full-load range with a supercharger which is switched off.

Outside the range 11, the clutch 3 is closed and the supercharger 2 is thus switched on (FIG. 2). The bypass-air control element 7 is largely closed and is used to regulate the boost pressure in accordance with the torque requirements of the internal combustion engine 1. The characteristic diagram outside the range 11 is characterized by the full load of the internal combustion engine 1, 9 denoting a full-load characteristic curve of the internal combustion engine with the supercharger 2 switched on and 10 denoting a full-load characteristic curve without the supercharger.

Figure 5:
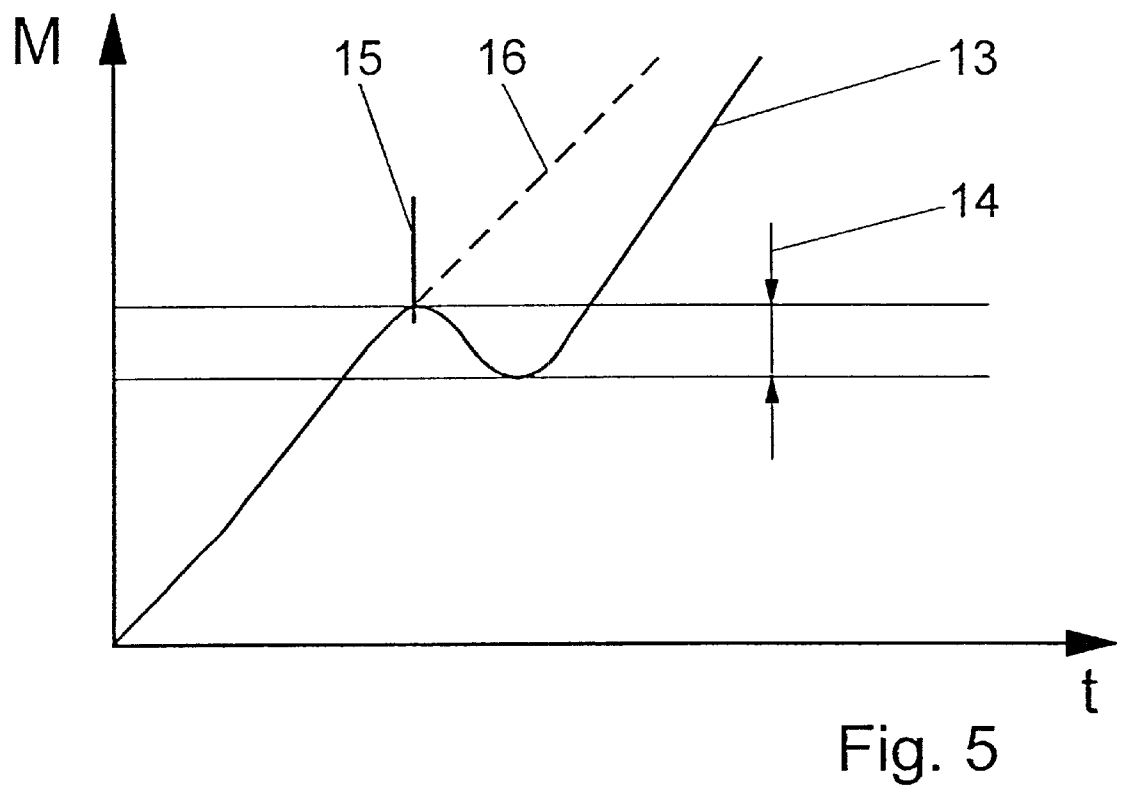

The torque M of the internal combustion engine 1 is plotted against time t in a diagram shown in FIG. 5. At time 15, the supercharger 2 is switched on. Owing to the mass moment of inertia, the torque M of the internal combustion engine 1 decreases and there is a sag 14. The measures according to the invention reduce or completely eliminate the sag 14 and, after time 15, the characteristic curve 13 continues as indicated by the broken line 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for controlling an internal combustion engine with a mechanically driven supercharger which can be switched on and off by means of a clutch and is arranged in a charge-air line, a bypass-air line with a bypass-air control element connecting the intake and delivery sides of the supercharger, a throttle valve being situated upstream of the supercharger or downstream in the charge-air line, and an engine control unit controlling the clutch or the bypass-air control element, or both, with specifiable values for a degree of opening or a switching state of the clutch, or both, wherein in a specified part-load range of the internal combustion engine, the bypass-air control element closes the bypass-air line as soon as the clutch is opens; wherein the rotational speed of the supercharger with the clutch open is controlled or regulated, or both, by the bypass-air control element; and wherein the torque of the internal combustion engine is increased while the clutch is being engaged.

2. Method according to claim 1, wherein the throttle valve of the internal combustion engine is opened.

3. Method according to claim 1, wherein the ignition of the internal combustion engine is adjusted.

4. Method according to claim 1, wherein the camshaft of the internal combustion engine is adjusted.

5. Method according to claim 1, wherein use is made of switchability of the intake pipe.

6. An internal combustion engine comprising:
a charge air line operable to supply charge air to engine combustion spaces,
a mechanically driven supercharger arranged in the charge air line and drivingly coupled to the engine by a clutch,
a bypass air line with a bypass air control unit connected to intake and delivery sides of the supercharger,
a throttle valve in the charge air line and
an engine control unit operable to control the bypass air control element and the clutch,
wherein in a specified part-load range of the internal combustion engine, the bypass-air control element completely closes the bypass-air line as soon as the clutch is open.

7. Process for controlling an internal combustion engine having a mechanically driven supercharger, which can be switched on and off via a clutch and which is positioned in a supercharger air line, with an air circulation line having an air circulation controller connecting the suction and pressure sides of the supercharger, a throttle valve being located upstream of the supercharger in the supercharger air line, and a motor control driving the clutch or the air circulation controller, or both, with presettable values for a degree of opening and/or a switching state of the clutch, in such a way that in a predetermined partial load range of the internal combustion engine, the air circulation controller closes the air circulation line as soon as the clutch is opened and, if the clutch is open, the air circulation controller controls, regulates, or both controls and regulates, the speed of the supercharger, characterized in that the torque of the internal combustion engine is increased as the clutch is being switched on.

8. Process of claim 7, wherein the throttle valve of the internal combustion engine is opened.

9. Process of claim 7, wherein the ignition of the internal combustion engine is adjusted.

10. Process of claim 7, wherein the camshaft of the internal combustion engine is adjusted.

* * * * *